United States Patent [19]
Roddy et al.

[11] Patent Number: 5,296,958
[45] Date of Patent: Mar. 22, 1994

[54] MULTIPLE WAVELENGTH LASER BEAM SCANNING SYSTEM

[75] Inventors: James E. Roddy; Badhri Narayan, both of Rochester, N.Y.

[73] Assignee: Eastman Kodak Company, Rochester, N.Y.

[21] Appl. No.: 890,407

[22] Filed: May 29, 1992

[51] Int. Cl.$^5$ .............................. G02B 26/08
[52] U.S. Cl. .................... 359/204; 359/206; 359/18; 359/216; 359/496; 346/108; 250/578.1
[58] Field of Search ............ 359/17, 18, 22, 196, 359/204, 206, 216, 217, 218, 219, 495, 496, 129, 133, 831, 833, 349; 346/108; 250/578.1, 235, 236; 358/75, 296

[56] References Cited
U.S. PATENT DOCUMENTS

| | | | |
|---|---|---|---|
| 3,430,048 | 2/1969 | Rubinstein | 250/199 |
| 3,447,856 | 6/1969 | De Lange et al. | 359/264 |
| 3,584,221 | 6/1971 | Furakawa | 250/199 |
| 3,982,819 | 9/1976 | Letellier | 359/496 |
| 4,274,101 | 6/1981 | Kataoka | 346/108 |
| 4,562,462 | 12/1985 | Egan | 358/75 |
| 4,566,761 | 1/1986 | Carlsen et al. | 359/495 |
| 4,634,232 | 1/1987 | Tateoka | 359/487 |
| 4,736,110 | 4/1988 | Awamura | 250/578.1 |
| 4,740,061 | 4/1988 | Miura | 359/320 |
| 4,744,075 | 5/1988 | Buhrer | 359/133 |
| 4,786,126 | 11/1988 | Kramer | 359/18 |
| 4,796,961 | 1/1989 | Yamada et al. | 359/218 |
| 4,800,556 | 1/1989 | Charlier et al. | 359/129 |
| 4,822,151 | 4/1989 | Tatsuno et al. | 359/495 |
| 4,826,268 | 5/1989 | Kramer | 359/18 |
| 4,924,321 | 5/1990 | Miyagawa et al. | 358/296 |
| 5,068,677 | 11/1991 | Matsuura et al. | 346/108 |

OTHER PUBLICATIONS

Applied Optics, vol. 4, No. 6, Jun. 1965, pp. 759-761.
Optics Guide 5, (Melles pp. 14-2 to 14-5; 14-16 Griot, 1990).

Primary Examiner—Loha Ben
Attorney, Agent, or Firm—Thomas H. Close

[57] ABSTRACT

Laser beam scanning system combines multiple light beams, each of differing wavelengths, to achieve a multiple wavelength scan exposure of a medium, or to increase throughput by writing plural lines simultaneously, or to provide one or more scanning beams of selected wavelength. A polarizing beam splitting prism of the Thompson type is employed as a multiple input beam combiner. The two input laser beam components can be made selectively coincident or closely parallel to form an output beam which is then redirected in a scanning motion and focused to an exposure plane.

30 Claims, 4 Drawing Sheets

MULTIPLE WAVELENGTH LASER BEAM SCANNING SYSTEM

CROSS REFERENCE TO RELATED APPLICATION

This application is related to commonly assigned U.S. patent application Ser. No. 890,452, now U.S. Pat. No. 5,194,980 issued Mar. 16, 1993, entitled THRESHOLDED HIGH POWER LASER BEAM SCANNING SYSTEM and filed in the name of J. Roddy on even date herewith.

FIELD OF THE INVENTION

The present invention relates to a laser beam scanning system.

BACKGROUND OF THE INVENTION

In a laser beam scanning system, it is advantageous to combine multiple laser beams, each of differing wavelengths, to achieve a multi-color scan exposure of a medium, or to increase throughput by writing plural lines simultaneously, or to provide output beams of selectable wavelengths (such as the provision of a read beam at one wavelength and a write beam at another wavelength). One conventional approach teaches the superimposition or combination of plural input beams into an output beam by use of a beam splitter operated in a reversed orientation.

However, the beam splitters proposed heretofore for beam combination, such as multi-layer dielectric coated mirrors, grating element, and pellicle beam splitters, exhibit a host of drawbacks, The named beam combiners are inefficient (i.e., they exhibit an undesireable amount of beam power loss) and are undesireably sensitive to factors such as the differential in the input beam wavelengths, the separation angle of the input beams, and the ambient temperature. These drawbacks are especially disadvantageous when the beam combiner is operated in a scanner wherein the radiometric accuracy of the output beam must be accurately maintained.

For example, as proposed by Tateoka in U.S. Pat. No. 4,634,232, two glass triangular prisms, one of which is coated with a polarizing multilayer mirror coating, are cemented together so that the mirror surface is on the cube diagonal. The multilayer mirror is typically a series of quarter wave interference coatings. The mirror surface transmits a first beam of one polarization and reflects another beam polarized orthogonally to the first beam. The passband, and hence the reflectivity and transmissivity of the mirror, is temperature, wavelength, and angle sensitive. Typically, only 80% of P-polarized light is transmitted and 90% of S-polarized light is reflected. Furthermore, the polarization purity of each beam component in the resulting output beam is unacceptable for some applications. The leakage component causes interference and the resultant intensity fluctuations can be quite objectionable.

Beam combiners formed from certain birefringent elements have been proposed for single wavelength multiple beam combiners. For example, a beam combiner in the form of a Wollaston or Rochon prism was proposed by Tatsuno et al. in U.S. Pat. No. 4,822,151 to combine phase-locked input beams emanating from a diode laser array operating at a single wavelength. However, such a beam combiner would suffer from undesireable angular variation in the output beam if the output beam is formed from input beams of differing wavelengths.

PROBLEM TO BE SOLVED BY THE INVENTION

A problem to be solved by the present invention is to provide an improved multiple-wavelength beam scanner operable for combining input laser beams of different wavelengths into a scanning output beam, whereby beam scanning of an exposure medium may be effected without incurring the above-described deficiencies in the prior art.

SUMMARY OF THE INVENTION

According to the present invention, a polarizing beam splitting prism of the Thompson type, made of a birefringent material such as calcite, is employed as a multiple input beam combiner in a beam scanning system. In a first embodiment, two laser beam sources emit respective linearly polarized input laser beams of orthogonal polarization and differing wavelengths to the input faces of the Thompson prism. The input beams are preferably separated by an approximately 45° separation angle. By aligning the input laser beams and then making minor rotations of the prism about two orthogonal axes (X and Y), the two input laser beam components can be made selectively coincident or adjacent to form the output beam, which is then collimated, redirected in a scanning motion, and focused to an exposure plane.

The contemplated system is operable over an extremely wide input beam wavelength range (350–2,200 nm) because the angle and direction of the output beam is not a function of input beam wavelength, and because the beam combining effect is accomplished without resort to interference effects. Moreover, the output beam intensity is insensitive to temperature variations and to changes in the separation angle and wavelengths of the input beams. An additional advantage is that the input beams are combined with greater efficiency (i.e., less power loss).

A laser beam scanning system constructed according to the present invention has particular utility in a multi-wavelength sensitometer used to test the exposure sensitivity of photographic and other exposure media at more than one exposure wavelength, or in applications demanding a multiple wavelength scanning output beam, such as in apparatus for writing a multicolor image. The system is contemplated as having utility in other applications, such as in effecting read/write exposure of an optical disc.

BRIEF DESCRIPTION OF THE DRAWINGS

To facilitate understanding of the following detailed description, like nomenclature and identical reference numerals are used to denote elements that are common more than one figure.

DETAILED DESCRIPTION OF THE INVENTION

Figure 1:
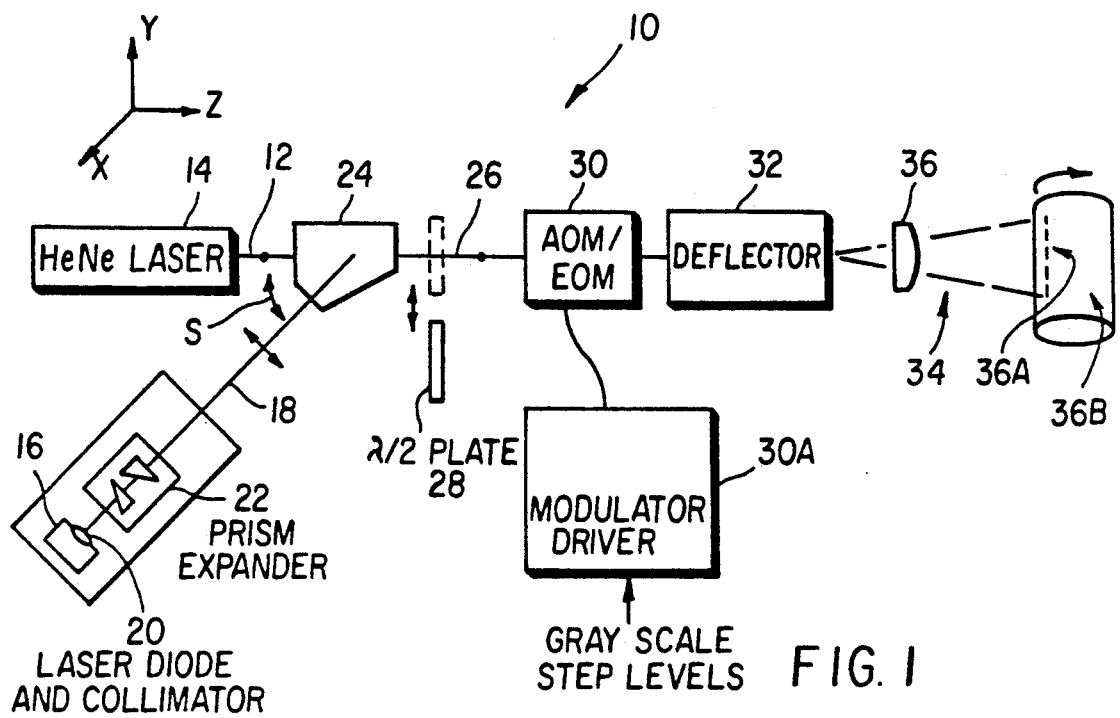
FIG. 1 is a simplified schematic illustration of a first preferred embodiment of a multiple wavelength light beam scanning system constructed according to the present invention.

A first preferred embodiment 10 of a multiple wavelength light beam scanner constructed according to the present invention is shown in FIG. 1. The illustrated embodiment 10 is preferred for use as a two wavelength sensitometer, although the illustrated (and similar) embodiments are useful in other applications. A first input beam 12 is provided by a first beam source 14 as a vertically-polarized (i.e., along the Y-axis) beam. The preferred first beam source is a monochromatic coherent laser beam source such as a HeNe laser. A second beam source 16, preferably in the form of monochromatic coherent laser diode, is oriented so that it provides a second, horizontally polarized (along the X-axis) input beam 18. A collimator lens 20 collimates the second input beam 18 and a beam shaper 22 in the form of a pair of prisms expands the beam horizontally to circularize it. The two linearly polarized input beams (which are orthogonally polarized with respect to each other) are introduced into a Thompson beamsplitting prism (hereinafter, Thompson prism) 24 at a separation angle S preferably approximately equal to 45°, although other angles are usable.

Figure 2:
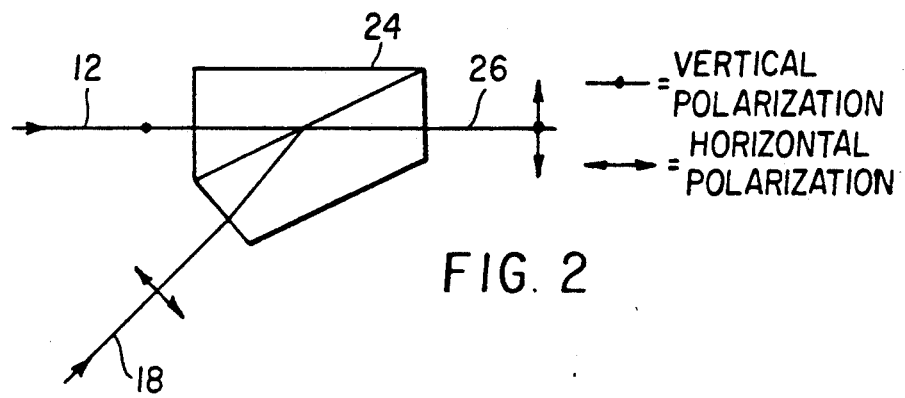
FIGS. 2 and 3 are a schematic ray tracing and a graphical representation, respectively, of the input beam separation angle of the Thompson prism of FIG. 1.
Figure 3:
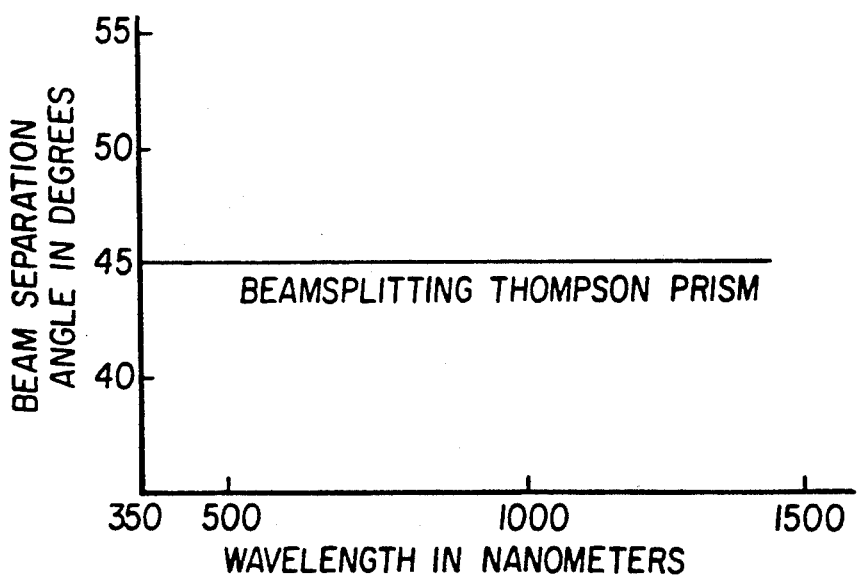

As further shown in FIGS. 2 and 3, the first and second input beams, having orthogonal polarizations, experience different indices of refraction in the Thompson prism 24 and are output from the prism as an output beam 26 having respective first and second input beam components. The two input beams 12, 18 are thus combined (made colinear) with each other to form the output beam 26. Output beam propagation is controlled by choosing the angle of the internal interface of the crystal components within the Thompson prism, and the crystal cut, such that one polarization is totally internally reflected and the other is transmitted at the internal interface.

A preferred embodiment of the Thompson prism 24 is commercially available as a Thompson beam splitting prism, product number 03PTB001 from Melles Griot, Inc., Irvine, Calif., with active surfaces that are optically polished and widely separated (approximately 45°). According to one aspect of the present invention, and in contrast to prior art beam combiners, the Thompson prism 24 is recognized as providing an output beam that does not vary in angular direction as a function of input beam wavelength. Hence, input beams having a wide range of wavelengths may be combined into one output beam that exhibits a single, unvarying angular direction. The Thompson prism is preferably composed of calcite, although other birefringent materials can be used. A cemented version of the Thompson prism is excellent for low and medium power levels from milliwatts to several watts. An uncemented Thompson prism can be used for very high power levels.

Generally, the various devices of the system, such as the input beam sources, are aligned to the Thompson prism and to each other according to techniques known in the art. However, in particular and in accordance with a further aspect of the invention, it is contemplated that one may alter the coincidence of the first and second input beam components within the output beam 26 by rotating the Thompson prism 24. Rotation of the prism may thus compensate for small misalignments of the beam sources. Also, rotation of the prism 24 about the Z-axis will effect relative vertical displacement of the first and second input beam components in the output beam 26. Rotation of the prism about the X-axis similarly will effect a controlled horizontal displacement of the first and second input beam components in the output beam 26. As a result, the output beam 26 may be selectably formed of multiple, closely spaced parallel input beam components so as to provide, for example, respectively leading and lagging, or upper and lower, scanning beam spots. In the illustrated embodiment 10, however, it is preferred that the beam components be made colinear so as to coincide in a single beam spot.

In this first preferred embodiment 10, the laser sources are sequentially activated and thus the output beam 26 is composed of either the first or the second input beam 12 or 18. A half wave plate 28 following the Thompson prism 24 is inserted in the output beam path whenever the second beam source 22 is active. The half wave plate 28 is removed by suitable means (not shown) whenever the first beam source 14 is active. When inserted in the beam path, the half wave plate 28 alters the polarization of the output beam 26 to vertical polarization. The output beam then passes through an acousto-optical or electro-optical modulator/noise reducer 30 wherein the beam intensity is modulated via a modulator driver 30A in an imagewise fashion to selectively-controlled levels. The output beam 26 is then deflected by a beam deflection means 32 in a scanning motion and the scanning beam 34 is focused by an f-theta lens 36 to an exposure plane 36A.

An exposure medium 38 is located at the exposure plane 36A to receive the scanning exposure. Preferably, the exposure medium is mounted on a moveable member 40 such that there may be relative movement of the scanning beam and the exposure medium in an orthogonal (cross scanning) direction. Alternatively, the exposure medium 38 may be mounted on a fixed member and the scanning and cross scanning motion may be imparted to the output beam 26 by the beam deflection means using techniques known in the art.

Preferably, the beam deflection means 32 includes a motor-driven rotatable polygon mirror beam deflector. Alternatively, a rotatable hologon beam deflector may be used wherein the hologon disk preferably includes at least first and second sectors respectively designed to deflect the first and second input beam components in the output beam. The grating period in each sector is constructed according to the particular wavelength of the respective input beam component. Rotation of the hologon disk is synchronized with the flow of image information provided to the modulator driver 32 to locate the appropriate sector in the path of the output beam 26 when a particular beam source is active.

The first preferred embodiment 10 is highly useful as a sensitometer for exposing sequential gray scale test strips on a selected samples of one type of photographic film. The output beam 26 is thus modulated in a stepwise fashion by the modulator driver 32 to provide first and second gray scale step wedges on the exposure medium 38; with sequential activation of the beam sources 14, 16, there is thus two individual exposures at differing wavelengths. Other modulation and exposure schemes may, of course, be accomplished for example, samples of different film types (each designed for exposure at a specific wavelength corresponding to one of the beam source wavelengths) may be positioned at the exposure plane and exposed at the requisite wavelengths.

Figure 4:
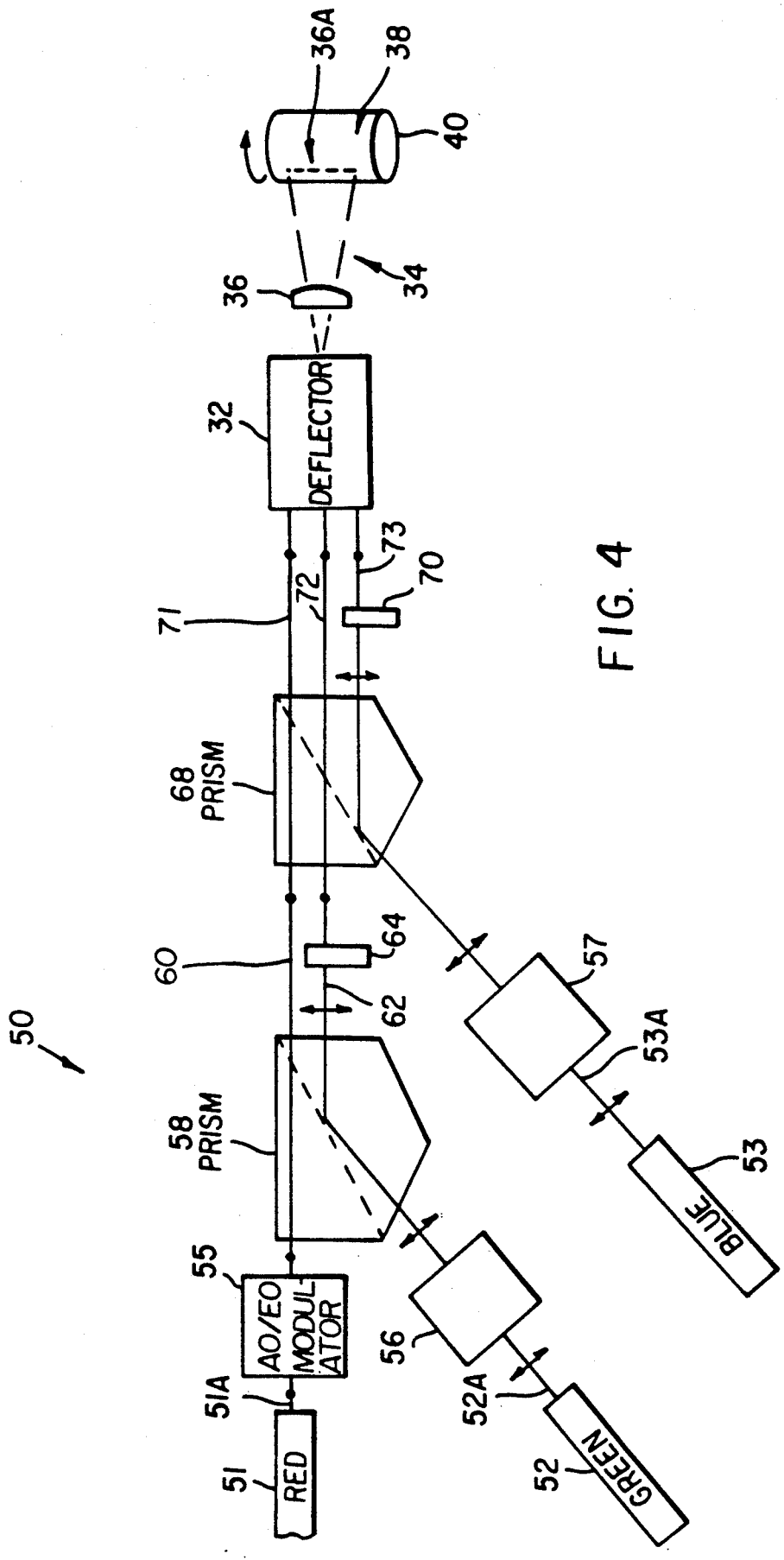
FIG. 4 is a simplified schematic illustration of a second preferred embodiment of a multiple wavelength light beam scanning system constructed according to the present invention, operable as a multicolor, simultaneous scan exposure system.

As illustrated in FIG. 4, a second preferred embodiment in the form of a simultaneous scan exposure, multicolor laser writer 50 may be constructed according to the present invention. First, second, and third laser beam sources 51, 52, 53 provide respective laser input beams 51A, 52A, 53A at respective first, second, and third wavelengths. The input beams are modulated by electro-optical or acousto-optical modulators 55, 56, 57 so as to convey differing color image information, e.g., representative of red, green, and blue color images. The first and second input beams 51A, 52A then enter a first Thompson prism 58 and emerge from that prism as closely parallel output beams 60, 62. A half wave plate 64 is inserted into the appropriate output beam such that two vertically polarized beams are output from the first Thompson prism and pass through a second Thompson prism 68. The third, horizontally polarized input beam 53A is input to the second Thompson prism and then polarized by a second half wave plate 70. The output of the second Thompson prism 68, in the form of first, second, and third parallel beam components 71, 72, 73, is then deflected by a polygon mirror-based beam deflection means 32 and focused to a single beam spot on the exposure plane 36A by the f-theta lens 36.

Alternatively, as shown in FIGS. 5A-5D, the beam deflection means 32 may be based upon a rotatable hologon beam deflector, wherein the rotatable hologon disk 80 includes certain sectors designed to deflect a beam having a specific wavelength.

The contemplated disk 80 has at least first, second, and third sectors 81, 82, 83 respectively designed to deflect the first, second, and third input beam components in the output beam to the exposure plane 36A. The grating period in each sector is selected according to the respective wavelength of the beam component to be deflected; rotation of the hologon disk 80 is synchronized with the flow of image information provided to the modulators 55, 56, 57 so that each sector is located in turn about the rotation axis X and in the beam path of the beam components 71, 72, 73.

Figure 5A:
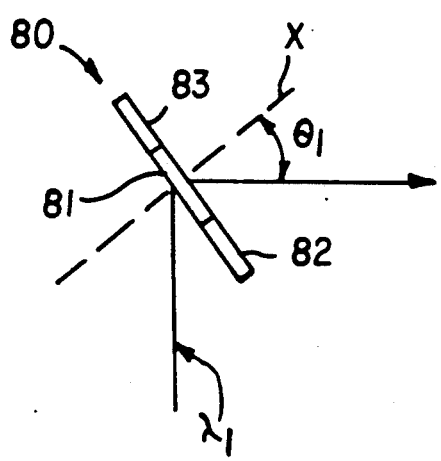
FIGS. 5A–5D are side schematic views illustrating a portion of one embodiment of the beam deflection means in the system of FIG. 4.
Figure 5B:
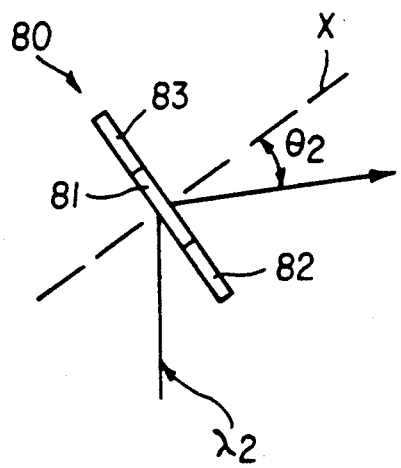
Figure 5C:
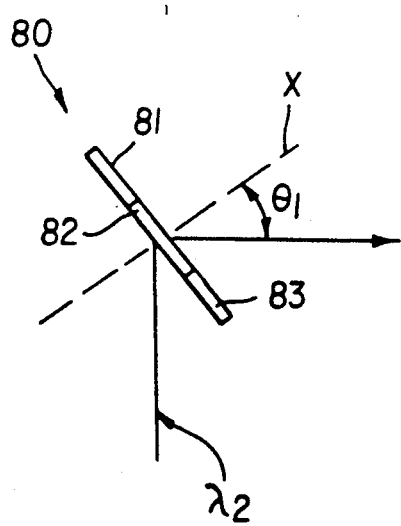
Figure 5D:
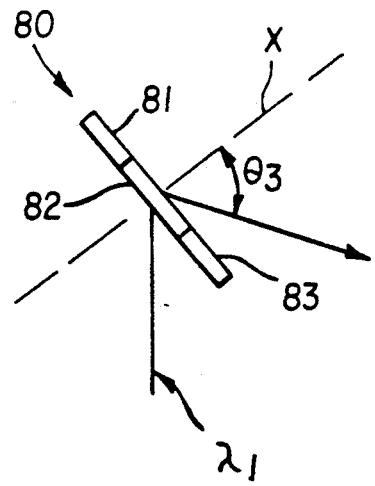

Each sector will deflect only the desired beam component to the exposure plane; the other, undesired beam components will be deflected away from the exposure plane. That is, as shown in FIG. 5A, the hologon disk 80 will include at least one first sector 81 having a line grating spacing determined by the first beam component wavelength $\lambda_1$ to provide the desired deflection angle $\theta_1$. As shown in FIG. 5B, the first sector 81 (when presented with a beam component having another wavelength $\lambda_2$) will deflect that beam component at another deflection angle $\theta_2$ to a position away from the exposure medium. A beam stop (not shown) may be appropriately positioned to absorb the unwanted beam. Similarly, and as shown in FIGS. 5C and 5D, the hologon disk 80 will include at least one second sector 82 having a second line grating spacing determined by the second beam component wavelength.

When the disk 80 is rotated, the second beam component having wavelength $\lambda_2$ is then deflected by the second sector 82 at the desired deflection angle $\theta_1$. The second sector 82, if presented with the first beam component wavelength $\lambda_1$, will deflect that beam component at still another deflection angle $\theta_3$ to a position away from the exposure medium. Another beam stop (not shown) may be appropriately positioned to absorb the unwanted beam.

Treatment of the three beam components by the third sector is correspondingly similar to the foregoing. The above-described preferred embodiment 50 may, with duplication of certain portions, be extended to include still more laser sources.

Figure 6:
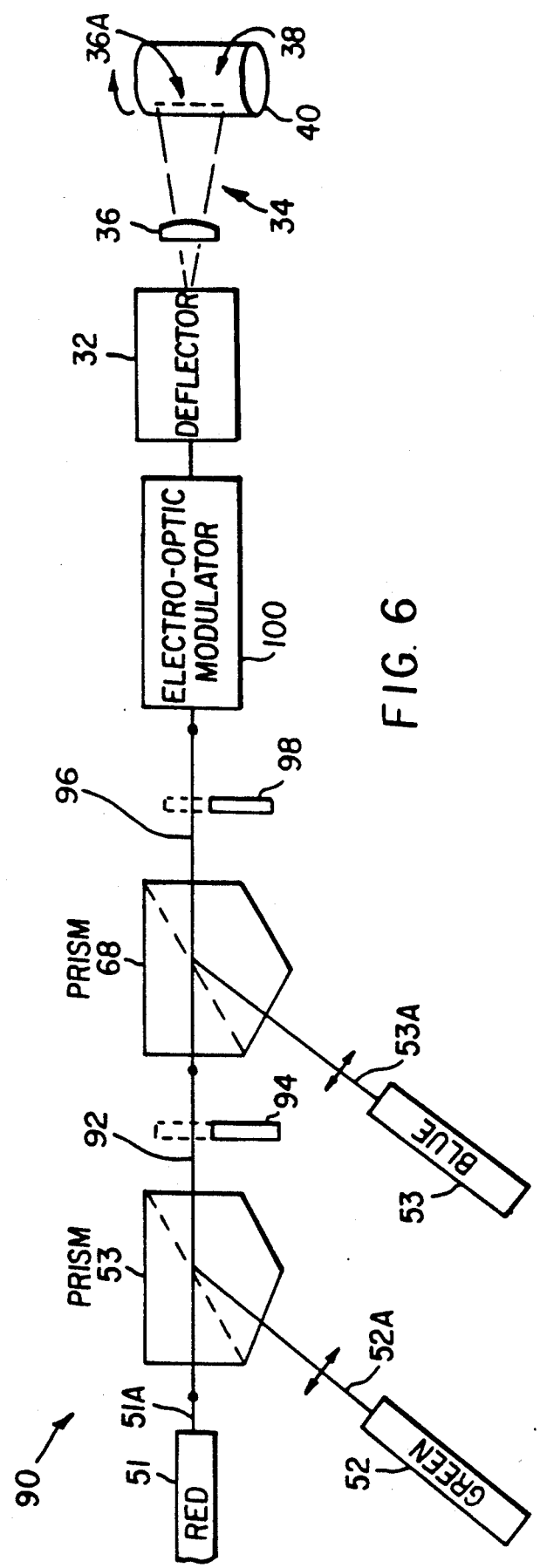
FIG. 6 is a simplified schematic illustration of a third preferred embodiment of the multiple wavelength light beam scanning system constructed according to the present invention, operable as a multicolor, sequential scan exposure system.

As shown in FIG. 6, a third preferred embodiment 90 in the form of a sequential scan exposure, multicolor laser writer may be constructed according to the present invention. First, second, and third laser beam sources 51, 52, 53 provide respective laser input beams 51A, 52A, 53A at first, second, and third wavelengths (e.g., red, green, and blue wavelengths). One of the beam sources, selectively activated depending upon the desired wavelength to be written, produces an input beam that enters either a first 58 or a second 68 Thompson prism.

(The first output beam from the first Thompson prism is polarized by a half wave plate 94 that is inserted when the second beam source 52 is active. The output beam from the first Thompson prism 58 becomes a single, vertically polarized input beam for the second Thompson prism 68.)

Emerging from the second Thompson prism is a respective second output beam 96. (If the third input beam source 53 is active, the second output beam 96 is polarized by a second half wave plate 98 inserted at such time in the output beam path.) The output beam 96 from the second Thompson prism is then modulated by a respective electro-optical or acousto-optical modulator 100 to represent the color information at the active wavelength (e.g., the red, green, or blue color image information). The modulated beam is then deflected by a beam deflecting means 32 and focused to a single beam spot on the exposure plane 36A by an f-theta lens 36.

Although several embodiments of the present invention have been shown and described herein, other embodiments may be constructed without departing from the scope or spirit of the invention. Examples of additional applications of one or more of the foregoing embodiments, or variations thereof, are contemplated as including a multiple wavelength laser beam scanning system for: achieving increased throughput by writing plural lines simultaneously, providing a scanning output beam having a selectable wavelength, or providing a read beam at one wavelength and a write beam at another wavelength.

What is claimed is:

1. A light beam scanning system comprising:
   multiple light beam sources for providing input beams at respectively differing wavelengths;
   a Thompson prism, locatable for receiving the input beams and for combining the input beams to form therefrom an output beam;
   means for modulating the output beam;
   means for deflecting the modulated output beam to provide a scanning beam; and
   means for focusing the scanning beam to an exposure plane for effecting scan exposure thereon.

2. The beam scanning system of claim 1, wherein the input beam are monochromatic coherent laser light.

3. The beam scanning system of claim 1, wherein the Thompson prism is formed of Calcite.

4. The beam scanning system of claim 1, wherein the modulation means further comprises an acousto-optical modulator.

5. The beam scanning system of claim 1, wherein the modulation means further comprises an electro-optical modulator.

6. The beam scanning system of claim 1, further comprising means for driving the modulation means according to image information in the form of gray scale step levels.

7. The beam scanning system of claim 1, wherein the deflecting means further comprises a polygonal mirror-based beam deflector.

8. The beam scanning system of claim 1, wherein the deflecting means further comprises a hologon-based beam deflector.

9. The beam scanning system of claim 8, wherein the hologon-based beam deflector comprises a hologon disk having plural sectors, each of which being locatable in the output beam path and having a grating period selected according to a corresponding one of the input beam wavelengths.

10. The beam scanning system of claim 1, wherein the focussing means further comprises an f-theta lens.

11. A multicolor, simultaneous scan exposure system, comprising:
 first, second, and third light beam sources providing respective input beams at respectively differing wavelengths;
 means for imagewise modulation of selected ones of the input beams;
 a first Thompson prism, locatable for receiving and for combining the first and second input beams to form therefrom a first output beam;
 a second Thompson prism, locatable for receiving and for combining the first output beam and the third input beam to form therefrom a second output beam;
 means for deflecting the second output beam to provide a scanning beam; and
 means for focussing the scanning beam to an exposure plane for effecting scan exposure thereon.

12. The beam scanning system of claim 11, wherein the input beams are monochromatic coherent laser light.

13. The beam scanning system of claim 11, wherein at least one of the first and second Thompson prisms is formed of Calcite.

14. The beam scanning system of claim 11, wherein the modulation means further comprises means for effecting imagewise modulation according to color image information corresponding to the first, second, and third input beam wavelengths.

15. The beam scanning system of claim 14, wherein the means for effecting imagewise modulation comprises first, second, and third electro-optical modulators respectively operable to modulate the first, second, and third input beams.

16. The beam scanning system of claim 14, wherein the means for effecting imagewise modulation comprises first, second, and third acousto-optical modulators respectively operable to modulate the first, second, and third input beams.

17. The beam scanning system of claim 11, wherein the deflecting means further comprises a polygonal mirror-based beam deflector.

18. The beam scanning system of claim 11, wherein the deflecting means further comprises a hologon-based beam deflector.

19. The beam scanning system of claim 18, wherein the hologon-based beam deflector comprises a hologon disk having plural sectors, each of which being locatable in the output beam path and having a grating period selected according to a corresponding one of the input beam wavelengths.

20. The beam scanning system of claim 11, wherein the focussing means further comprises an f-theta lens.

21. A multicolor, sequential scan exposure system, comprising:
 first, second, and third light beam sources providing respective input beams at respectively differing wavelengths;
 a first Thompson prism, locatable for receiving and for combining the first and second input beams to form therefrom a first output beam;
 means, positionable in the path of the first output beam, for altering the polarization of the first output beam;
 a second Thompson prism, locatable for receiving and for combining the first output beam and the third input beam to form therefrom a second output beam;
 means, positionable in the path of the second output beam, for altering the polarization of the second output beam;
 means for imagewise modulation of the second output beam;
 means for deflecting the second output beam to provide a scanning beam; and
 means for focussing the scanning beam to an exposure plane for effecting scan exposure thereon.

22. The beam scanning system of claim 21, wherein the input beams are monochromatic coherent laser light.

23. The beam scanning system of claim 21, wherein at leat one of the first and second Thompson prisms is formed of Calcite.

24. The beam scanning system of claim 21, wherein the modulation means further comprises means for effecting imagewise modulation according to color image information corresponding to the first, second, and third input beam wavelengths.

25. The beam scanning system of claim 24, wherein the means for effecting imagewise modulation comprises an acousto-optical modulator.

26. The beam scanning system of claim 24, wherein the means for effecting imagewise modulation comprises an electro-optical modulator.

27. The beam scanning system of claim 21, wherein the deflecting means further comprises a polygonal mirror-based beam deflector.

28. The beam scanning system of claim 21, wherein the deflecting means further comprises a hologon-based beam deflector.

29. The beam scanning system of claim 28, wherein the hologon-based beam deflector comprises a hologon disk having plural sectors, each of which being locatable in the output beam path and having a grating period selected according to a corresponding one of the input beam wavelengths.

30. The beam scanning system of claim 21, wherein the focussing means further comprises an f-theta lens.

* * * * *